Figure 1:
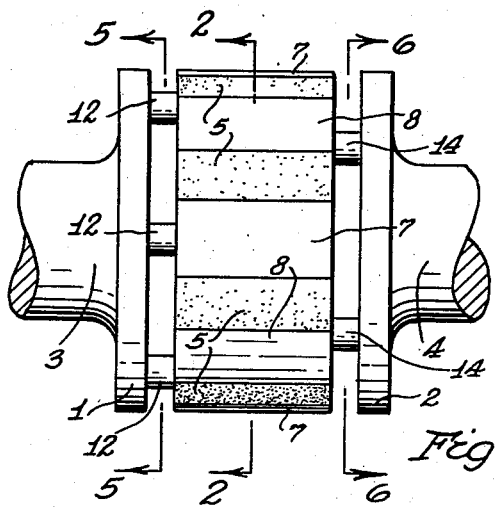

Jan. 13, 1942.   E. H. PIRON   2,270,140

UNIVERSAL JOINT

Filed Dec. 13, 1939

INVENTOR.
Emil H. Piron
BY
ATTORNEY.

Patented Jan. 13, 1942

2,270,140

UNITED STATES PATENT OFFICE 2,270,140

UNIVERSAL JOINT

Emil H. Piron, New York, N. Y., assignor to Transit Research Corporation, a corporation of New York Application December 13, 1939, Serial No. 309,054

5 Claims. (Cl. 64—13)

This invention relates to shaft coupling means, or universal joints, and has for its primary object to provide a flexible connection between two shafts, or similar elements, wherein rubber or similar elastic plastic material is used to transmit torque between two shafts having angularly related axes. This invention is similar to and in some respects an improvement on the universal joint shown in my co-pending application Serial No. 249,855, filed January 9, 1939.

Another object is to provide a flexible coupling or universal joint embodying elastic plastic means capable of absorbing vibrations to make possible the transmission of motion or torque from one shaft to another without transferring vibrations from one shaft to the other and, further, which is resilient torsionally to permit relative windup between the two shafts it connects in the presence of sudden abnormal loading, thereby to prevent sudden loading of the load receiving shaft.

Another object is to provide a flexible coupling so constructed as to eliminate the use of bolts, screws or similar small parts which might become loosened under high speed use.

Another object is to provide a flexible coupling or universal joint construction which may be manufactured or produced with machinery such as is available in the average machine shop, rather than requiring the use of special machinery. For instance, the joint is so designed that the metal parts may be produced by means of drill presses and lathes, rather than by specially designed machinery which requires a large capital investment.

Another object is to provide a coupling or universal joint construction including an elastic plastic mass functioning as the torque transmitting means between the two main members of the coupling or joint, and means connecting the main members to the elastic mass in such manner that said elastic mass is entirely free from tensional forces. In a coupling or joint of the type here concerned one region of the elastic mass is ordinarily subjected to compression forces and the region diametrically opposite thereto is simultaneously subjected to tension forces when the axes of the two main members are angularly related. In the present coupling, in accordance with this object, the elastic mass is radially compressed during assembly and is maintained in a state of compression after assembly. The amount of compression of the elastic mass is chosen according to the contemplated use of the coupling, and is such that it exceeds the tension forces developed in service. The advantage of such an arrangement is that no actual separative forces are developed between the rubber mass and the elements connected thereto when the coupling is placed in service.

Figure 2:
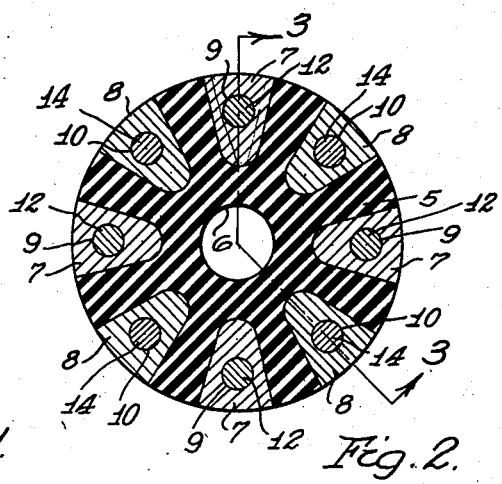
Figure 3:
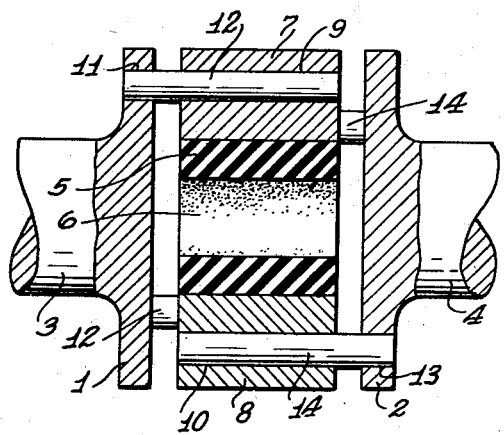
Figure 4:
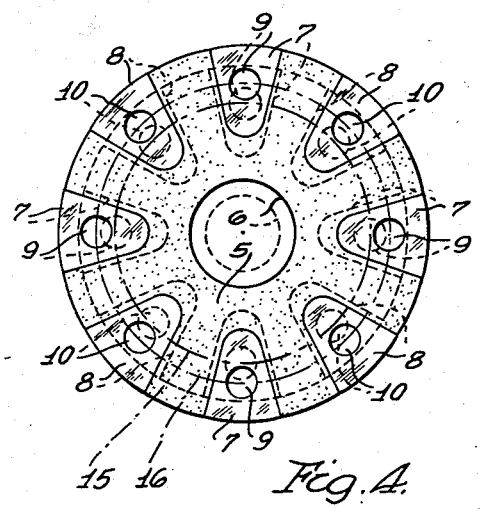
Figure 5:
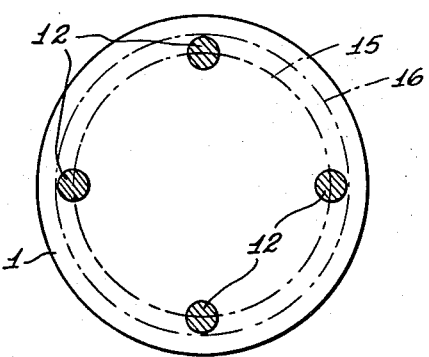
Figure 6:
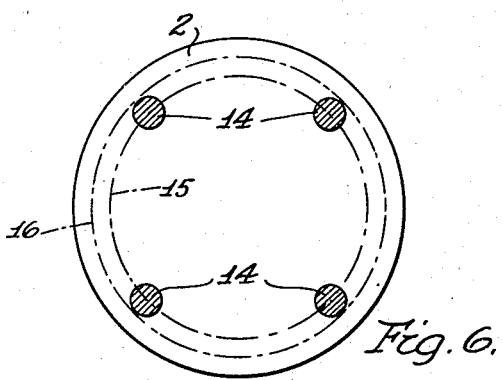

Other objects and advantages will become more fully apparent as reference is had to the accompanying drawing wherein the invention is illustrated, and in which:

Fig. 1 is a side elevation of the coupling,
Fig. 2 is a section taken on the line 2—2 of Fig. 1,
Fig. 3 is a section taken on the line 3—3 of Fig. 2,
Fig. 4 is an elevation of the elastic unit, and
Figs. 5 and 6 are views taken on the lines 5—5 and 6—6, respectively, of Fig. 1.

More specifically, 1 and 2 designate two circular plates which constitute the two flanges of the coupling or joint. By way of example, a shaft 3 is shown integral with the flange 1 and a similar shaft 4 is shown integral with the flange 2. It will be understood, however, that the particular form of or attachment of the elements to be connected, illustrated as comprising the shafts 3 and 4, has no bearing on the invention.

Interposed between the two flanges is a mass 5 of elastic plastic material, preferrably comprising a substantially cylindrical piece of rubber, having an axially arranged hole 6. Substantially sector-shaped metal elements 7 and 8 are imbedded and vulcanized in the rubber. The elements 7 and 8 are all identical and in the illustrated embodiment there are four elements 7 and four elements 8, with an element 7 between each pair of elements 8 and spaced 45° therefrom. The particular number of elements 7 and 8 shown by way of illustration is not critical, and might vary to suit different contemplated conditions of operation. There might, for example, be two, three, four, or more elements 7, but in each case there will be a corresponding number of identical parts 8.

Each element 7 has a hole 9 extending longitudinally therethrough, and each element 8 has a hole 10 extending longitudinally therethrough, with the several holes 9 and 10 of equal diameter and extending parallel to the axis of the elastic mass 5. The several elements are spaced equal distances from the axis of the mass 5, and the location of the holes in the several elements is identical, and it follows, therefore, that the centers of all the holes fall on a circle having the axis of the mass 5 as its center.

The flange 1 is provided with a multiplicity of holes 11 corresponding in number to the number of holes 9 and equally spaced apart. Metal rods 12 having a diameter slightly larger than that of the holes 11 are press fitted into the holes 11 and extend outwardly from the flange 1 and into the holes 9 in the metal elements 7. It is preferred that the rods 12 are also press fitted into the holes 9.

The flange 2 has holes 13 in which similar rods 14 are press fitted. The rods 14 extend from the flange 2 into the holes 10 in the metal elements 8, and are preferably press fitted therein.

In Figs. 4, 5 and 6, 15 designates a circle upon which the centers of all of the rods 12 and 14 are located, and on Fig. 4, 16 designates a circle upon which the centers of all of the holes 9 and 10 are located prior to assembly of the elastic element between the flanges. The circle 16 is of slightly greater radius than the circle 15, as may be observed, and, therefore, the normal radial distance between the center of the elastic mass 5 and the centers of the holes 9 and 10 is greater than the radial distance between the center of the elastic mass and the centers of the rods 12 and 14. This, of course, necessitates compression of the elastic mass in order to insert the rods 12 and 14 in the holes 9 and 10.

For purpose of assembly, the elastic mass 5 is radially compressed in a circular clamp (not shown) until the radial spacing of the holes 9 and 10 is equal to the radial spacing of the rods 12 and 14. The rods 12 and 14 are of such length that after assembly, as above described, they extend into the region of but not farther than the opposite face of the rubber mass 5, when the several parts of the coupling are assembled with a space between the flanges and the sides of the rubber mass adjacent thereto. Obviously, insertion of the rods 12 and 14 in the holes in the metal elements 7 and 8 prevents the metal elements from expanding back to their normal position when the clamping pressure is removed, and therefore maintain a state of radial compression in the rubber mass 5.

When the coupling or joint is placed in use, torque or motion imposed on one flange, say 1 for example, is transmitted to the metal elements 7 by the rods 12, and the forces thus imposed on the elements 7 are transmitted to the metal elements 8 through the rubber 5, and to the flange 2 by the rods 14.

It is apparent that rotation of the coupling with the axes of the flanges 1 and 2 causes one region of the rubber to be subjected to a compression force while the region diametrically opposite thereto ordinarily would be subjected to a tension force. However, the difference between the radii of the two center circles 15 and 16 is chosen so that when the rubber mass 5 is radially compressed as above described the compression developed between the metal elements 7 and 8 is such that it is larger than the maximum tension force developes in service, and actual separative forces are never developed between the rubber and the metal parts vulcanized thereto.

What is claimed is:

1. In a flexible coupling, a pair of main members, a substantially cylindrical elastic element between the main members, circumferentially spaced metal elements imbedded in the elastic element and extending inwardly radially from the periphery thereof to a distance substantially less than the radial thickness of said elastic element, said metal elements being substantially sector shape as viewed in transverse section and a thickness such that they extend entirely through said elastic element, and means connecting opposite main members to alternate metal elements.

2. In a flexible coupling, a pair of main members, a substantially cylindrical elastic element between the main members, circumferentially spaced metal elements imbedded in and of substantially equal thickness with the elastic element and extending inwardly radially from the periphery thereof, said metal elements being substantially sector shape as viewed in transverse section, and means connecting opposite main members to alternate metal elements, said last named means being rigidly spaced radially from the axis of the elastic element a distance less than that of receiving holes therefor in the metal elements before assembly therewith whereby they coact with the metal elements in maintaining the elastic element in a state of compression upon assembly.

3. In sub-combination, an elastic element comprising a substantially cylindrical mass of elastic plastic material having a multiplicity of metal elements imbedded therein and of substantially equal thickness therewith, said metal elements as viewed in transverse section being substantially triangular with the base thereof conforming to the outer periphery of said cylindrical element and with the height thereof substantially less than the radial thickness of said elasic element.

4. In a flexible coupling, a pair of main members, an elastic element between said members having an axial opening therethrough, two sets of metallic elements embedded in said elastic element in spaced relation with said axial opening, the members of one of said sets alternating with those of the other set, said main members and said metallic elements each having openings therethrough, and rod means extending through said openings to secure said metallic elements to said main members, the openings through said metallic elements being at a greater distance from the axis of said elastic element than the distance of the corresponding openings through said main members from the axis thereof prior to said assembly whereby in normal assembly said elastic element is under substantial radial compression.

5. In a flexible coupling, a pair of main members, an elastic element between said members having an axial opening therethrough, two sets of metallic elements embedded in said elastic element in spaced relation with said axial opening, the members of one of said sets alternating with those of the other set, said main members and said metallic elements each having openings therethrough, and rod means extending through said openings to secure said metallic elements to said main members, the openings through said metallic elements being at a greater distance from the axis of said elastic element than the distance of the corresponding openings through said main members from the axis thereof prior to said assembly whereby in normal assembly said elastic element is under substantial radial compression, said main members being adapted to assume relative angular positions with respect to each other thereby distorting the original shape of said elastic element, said elastic element being under compression stresses of such predetermined magnitude as never to reach zero value at maximum angularity of said main members.

EMIL H. PIRON.